(12) United States Patent
Oliver et al.

(10) Patent No.: US 7,196,290 B2
(45) Date of Patent: Mar. 27, 2007

(54) HEAT SEALER WITH PLATEN SURFACE TEMPERATURE SENSOR AND LOAD SENSOR

(75) Inventors: William Michael Oliver, Cincinnati, OH (US); Douglas J. Robinson, Cincinnati, OH (US); Jon T. Sharrah, Mason, OH (US); Alford Jack Ramey, Waynesville, OH (US); John A. Lynch, Hamilton, OH (US)

(73) Assignee: Planet Products Corporation, Cincinnati, OH (US)

( * ) Notice: Subject to any disclaimer, the term of this patent is extended or adjusted under 35 U.S.C. 154(b) by 28 days.

(21) Appl. No.: 10/858,627

(22) Filed: Jun. 2, 2004

(65) Prior Publication Data

US 2005/0006371 A1    Jan. 13, 2005

Related U.S. Application Data

(60) Provisional application No. 60/474,972, filed on Jun. 2, 2003.

(51) Int. Cl.
*B30B 1/38* (2006.01)
*H05B 3/26* (2006.01)
*G05D 15/01* (2006.01)
*G05D 23/27* (2006.01)

(52) U.S. Cl. .................. 219/243; 219/243; 219/490; 219/494; 156/583.1; 53/370.7; 53/373.7; 53/375.9; 53/376.6; 100/319; 100/38

(58) Field of Classification Search ............... 219/243, 219/490, 494; 156/583.1–583.91; 53/370.7–371.9, 53/373.7–375.5, 375.9, 376.6; 100/38, 319–326; 101/9, 21, 31

See application file for complete search history.

(56) References Cited

U.S. PATENT DOCUMENTS

| 3,721,801 | A | * | 3/1973 | Bate | ......................... | 219/243 |
| 3,925,139 | A | * | 12/1975 | Simmons | .................... | 156/358 |
| 4,202,721 | A | | 5/1980 | Roberts | | |

(Continued)

FOREIGN PATENT DOCUMENTS

| EP | 529106 | * | 3/1993 |
| JP | 57-35737 | * | 2/1982 |

OTHER PUBLICATIONS

Swain, Erik, "Electronics Seal the Deal," Pharmaceutical & Med. Packaging News, Jun. 1999, available at http://www.devicelink.com/pmpn/archive/99/06/002.html (last visited Sep. 27, 2005).*

*Primary Examiner*—Robin Evans
*Assistant Examiner*—Stephen J. Ralis
(74) *Attorney, Agent, or Firm*—Thompson Hine LLP

(57) ABSTRACT

A heat sealer having a heated platen, a cylinder for reciprocating the platen, a die positioned to be engaged by the platen and a shuttle supporting the die to move the die from a platen-engaging position to a non-engaging position, and a control for controlling the temperature of the platen and the force applied to the platen against the die by the cylinder. The invention also includes a temperature sensor for sensing the surface temperature of the platen and a load sensor for sensing the force applied by the platen to the die. In one embodiment, the temperature sensor is an infrared temperature sensor that reads the surface temperature of the platen and the load sensor is a load cell positioned beneath the die and supporting the die so that the load sensors can measure the direct force applied by the platen against the die. Also, in one embodiment, the infrared sensor is positioned beneath the die so that it can read the platen temperature when the die is displaced to the non-engaging position.

8 Claims, 2 Drawing Sheets

U.S. PATENT DOCUMENTS

| | | | |
|---|---|---|---|
| 4,214,164 A | 7/1980 | Traub et al. | |
| 4,413,463 A * | 11/1983 | Lancaster | 53/399 |
| 4,647,222 A | 3/1987 | Schultheiss | |
| 4,648,222 A | 3/1987 | Miyata et al. | |
| 4,859,079 A | 8/1989 | Wickersheim et al. | |
| 5,096,525 A * | 3/1992 | Engwall | 156/196 |
| 5,117,613 A | 6/1992 | Pfaffmann | |
| 5,231,923 A * | 8/1993 | Ohta et al. | 100/46 |
| 5,252,171 A * | 10/1993 | Anderson et al. | 156/358 |
| 5,272,854 A | 12/1993 | Ye et al. | |
| 5,438,883 A * | 8/1995 | McLean | 73/862.632 |
| 5,528,918 A | 6/1996 | Kirii | |
| 5,742,023 A | 4/1998 | Fortmann | |
| 5,772,835 A * | 6/1998 | Jordan et al. | 156/358 |
| 5,787,681 A * | 8/1998 | Papina et al. | 53/373.7 |
| 5,826,403 A | 10/1998 | Haley | |
| 5,894,709 A | 4/1999 | Fosshage | |
| 6,098,532 A | 8/2000 | Sebastian et al. | |
| 6,205,916 B1 | 3/2001 | Castleton | |
| 6,245,167 B1 | 6/2001 | Stein | |
| 6,391,133 B1 * | 5/2002 | Dul | 156/64 |
| 6,537,057 B2 | 3/2003 | Tamaki et al. | |
| 6,719,863 B2 * | 4/2004 | Basque | 156/64 |
| 2002/0095909 A1 * | 7/2002 | Duncan et al. | 53/51 |
| 2004/0217100 A1 * | 11/2004 | Ogimoto et al. | 219/243 |

* cited by examiner

HEAT SEALER WITH PLATEN SURFACE TEMPERATURE SENSOR AND LOAD SENSOR

BACKGROUND

This application claims priority to U.S. Provisional App. Ser. No. 60/474,972 filed Jun. 2, 2003, the contents of which are hereby incorporated by reference. The present invention relates to heat-sealing devices and, more particularly, to tray heat sealers having a press with a heated platen and a shuttle for supporting product.

Heat sealers are known in the art. A specific example of a heat sealer that may be used according to the present invention is the medical tray heat sealer manufactured by Atlas Vac, a division of Planet Products Corp. of Cincinnati, Ohio. The AV model 15:18 heat sealer, manufactured by Atlas Vac, is typical of many heat sealers of this type.

Heat sealers are used to seal packages by simultaneously applying heat and high pressure. Heat sealers typically include a support assembly and a press plate having a heated platen. A product may be placed onto the support assembly and the press plate may advance towards the product such that the heated platen contacts the product and simultaneously applies heat and pressure to seal the product. The amount of pressure being applied and the temperature of the platen must be carefully controlled to ensure a quality seal. However, prior art heat sealers monitor the temperature of the platen using thermocouples embedded in the heater and/or platen and therefore do not accurately measure the temperature of the sealing surface of the platen. In addition, such prior art heat sealers do not contain means for accurately measuring the force of the press plate. Rather, prior art devices typically measure the air or fluid pressure of the cylinder driving the press plate, which is an approximation of the force at best. Also, prior art heat sealers require manual control of the force of the press plate and the temperature of the platen.

Accordingly, there is a need for a heat sealer capable of accurately sensing the temperature of the sealing surface of the platen. Furthermore, there is a need for a heat sealer capable of accurately sensing the direct force exerted by the press plate onto the support assembly and there is a need for a heat sealer that is capable of controlling the operation of the heat sealer, including the sealing temperature and pressure, by a programmable logic controller.

SUMMARY

The present invention is embodied in a heat sealer having a heated platen, a cylinder for reciprocating the platen, a die positioned to be engaged by the platen, a shuttle supporting the die to move the die from a platen-engaging position to a non-engaging position, and a control for controlling the temperature of the platen and the force applied to the platen against the die by the cylinder. The invention includes a temperature sensor for sensing the surface temperature of the platen and a load sensor for sensing the force applied by the platen to the die. In one embodiment, the temperature sensor is an infrared temperature sensor that reads the surface temperature of the platen and the load sensor is a load cell positioned beneath the die and supporting the die so that the load sensors can measure the direct force applied by the platen against the die. Also, in one embodiment, the infrared sensor is positioned beneath the die so that it can read the platen temperature when the die is displaced to the non-engaging position.

Other objects, features and advantages of the present invention will become apparent to those skilled in the art from the detailed description, the accompanying drawings and the appended claims.

BRIEF DESCRIPTION OF THE DRAWINGS

The invention may be understood with reference to the following drawings. In the drawings, like reference numerals designate corresponding parts throughout the several views. Also, the components in the drawings are not necessarily to scale.

DETAILED DESCRIPTION

Figure 1:
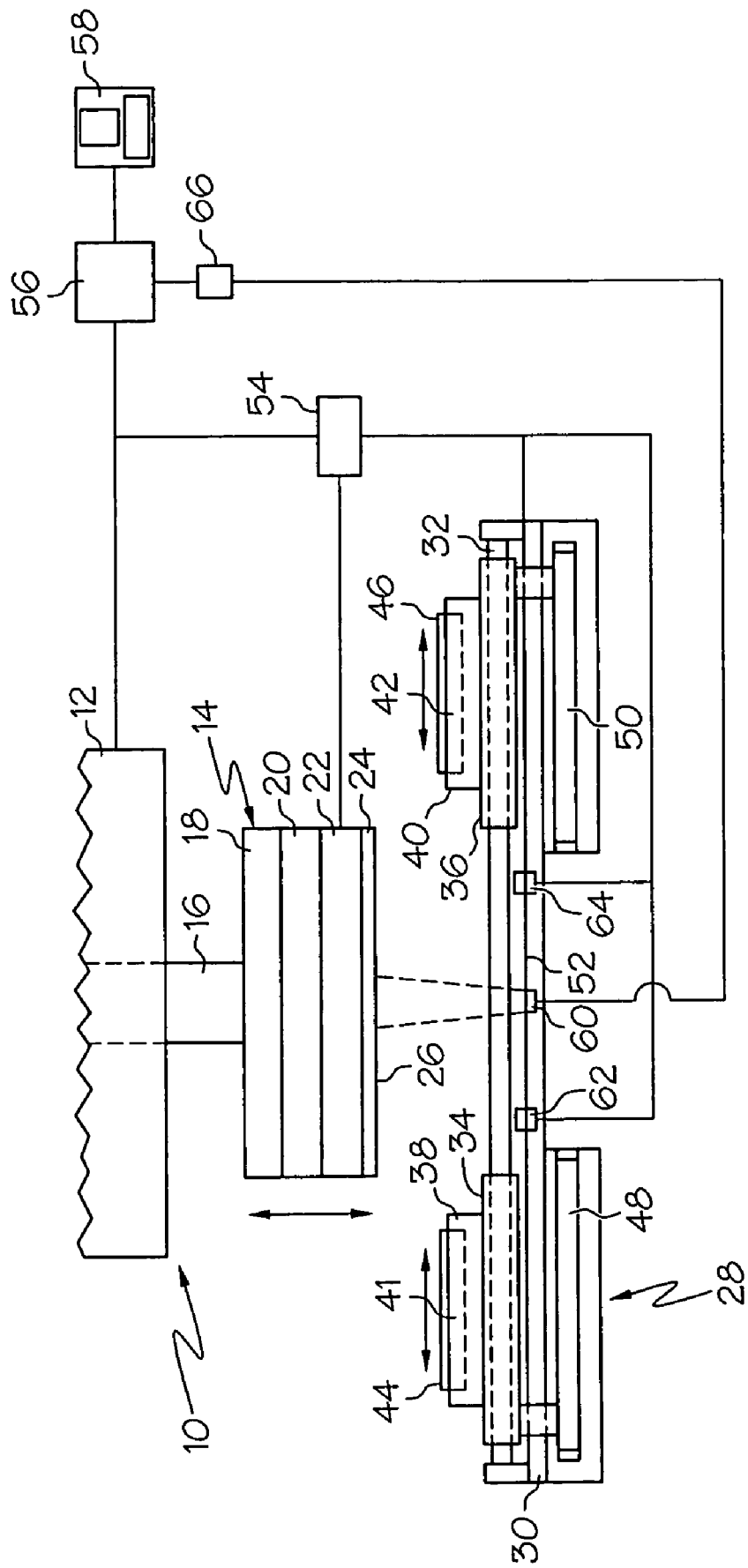
FIG. 1 is schematic, side elevational view of the heat sealer of the present invention.
Figure 2:
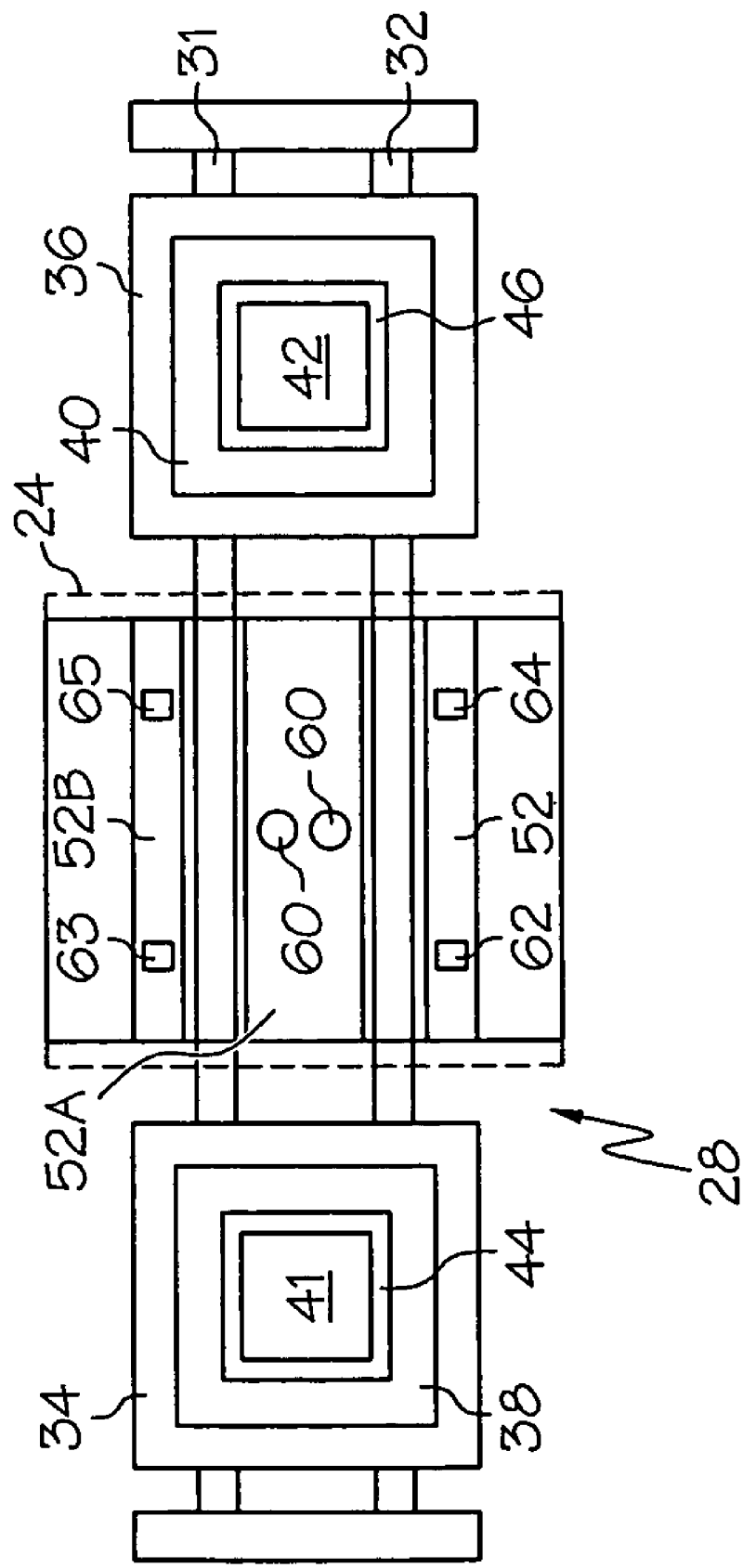
FIG. 2 is a schematic, top plan view of the heat sealer of FIG. 1.

As shown in FIGS. 1 and 2, the heat sealer used according to the present invention, generally designated 10, includes an upper housing 12 that supports a press, generally designated 14. The press 14 is air actuated and includes an air cylinder 16 connected to a press plate 18. A heat insulator 20 is attached directly to the press plate 18 and a plate-shaped heating element 22 is mounted on the insulator. A platen 24 is mounted on the heating element 22 and is finished with a coating of a nonstick material, such as Silverstone (a trademark of E.I. du Pont de Nemours & Co., Wilmington, Del.) on its underside 26.

Beneath the press 14 is a twin shuttle assembly, generally designated 28. The shuttle assembly 28 includes a support frame 30 on which is mounted a pair of tubular rods 31, 32. Shuttle bases 34, 36 are slidably mounted on the rods 31, 32. Shuttle bases 34, 36 support dies 38, 40. Dies 38, 40 each include a recess 41, 42 surrounded by a gasket 44, 46, respectively. The shuttle bases 34, 36 are displaced by rodless cylinders 48, 50, respectively, mounted to the frame 30.

Directly beneath the platen 24 are three plastic wear rails, 52, 52A, 52B that are mounted on the frame 30 positioned between the two rods 31, 32 and are raised above the frame 30 to support the shuttle bases 34, 36 in response to the pressure of the press 14.

The heating element 22 is controlled by a programmable logic controller 54 and preferably is of the electrical resistance variety. The programmable logic controller 54 is part of a control unit 56 that includes a display 58 and cycles the press 14, controls the heating element 22 and controls the load being applied by the cylinder 16.

In operation, the cylinders 48, 50 alternately cycle, thereby displacing their respective shuttle bases, 34, 36 from a displaced position (shown in FIG. 1) to a position directly beneath the press 14. When, for example, the shuttle base 34 is positioned directly beneath the press 14, the press cylinder 16 is cycled, causing the heated platen 24 to engage the gasket 44 on the die 38. Product, typically a package to be heat-sealed and having a heat-sealable material about its border directly above the gasket 44, is placed within the recess 40. The heat and pressure generated by the platen plate 24 causes the product (not shown) within the recess 40 to be sealed about its periphery. The pressure of the press 14 causes the rods 31, 32, which support the shuttle base 34, to deflect downwardly until the underside of the shuttle base engages the wear rails 52, 52A, 52B.

It is important to obtain an accurate reading of the surface temperature (as opposed to the temperature of the heating element 22 itself) in order to operate the heat sealer 10 according to a prescribed temperature and force combination to achieve optimal sealing effect on the work product. Accordingly, there is a need to provide a heat sealer with accurate temperature and force sensing capabilities.

A first embodiment of the present invention, shown schematically in FIGS. 1 and 2, includes means for sensing the surface temperature of the platen 24 itself. In the present invention, this means includes a pair of infrared sensors 60. An appropriate infrared sensor is the Omega OS 100 series manufactured by Omega Engineering, Inc. of Stamford, Conn. The infrared sensor 60 is embedded in the center wear rail 52A; that is, the wear rail located between the rods 31 and 32 that support the shuttle bases 34, 36. Preferably, a pair of infrared sensors 60 are each located centrally and aligned transversely in wear rail 52A. The infrared sensor is directed to take a temperature reading of the underside 26 of the platen plate 24 and feed the data to the controller 56, where the actual temperature of the surface that contacts the work product on the shuttles 34, 36 is displayed at display 58 and can be adjusted accordingly by an operator.

During the operation of the heat sealer 10, the temperature readings of the underside 26 of platen 24 are taken during the intervals in which the shuttles 34, 36 are displaced sidewardly as shown in FIGS. 1 and 2. The reading is not taken when the shuttles are placed directly beneath the press 14 during a sealing operation, thus obscuring the surface 26.

An additional feature of the heat sealer 10 of the present invention is that it includes means for sensing the actual force supplied by the press 14 against dies 44, 46. In the embodiment shown in FIG. 1, this pressure sensing means includes pairs of load sensors 62, 63, 64 and 65 that are embedded in wear rails 52, 52B. The load cells 62, 63, 64, 65 preferably are Omega LC304-10K series available from Omega Engineering, Inc. of Stamford, Conn. The load cells 62–65 are mounted within the wear rails 52, 52B such that they protrude slightly above the upper surfaces of the wear rails. In this fashion, the load cells 62–65 contact the shuttle bases 34, 36 that are deflected downwardly in response to the pressure from the press 14. The outputs of the load cells 62–65 are transmitted to the control 56 where they are displayed at 58. In the preferred embodiment, each of the load cells 62–65 includes a signal conditioner 66, such as Omega IRDN-ST series, also available from Omega Engineering, Inc. Preferably, the heat sealer 10 includes four load cells 62, 63, 64, 65; two each mounted in the wear rails 52, 52B (see FIG. 2).

In operation, the force applied to load cells 62, 64 by press 14 through product gaskets 44, 46, dies 38, 40 and shuttles 34, 36 generates signals through conditioners 66 to control 56, where the forces are read as analog values at 58. In the alternative, the forces could be read as actual forces (e.g., 5000 psi). Preferably, the control 56 includes software that averages the values transmitted by each of the four load cells 62, 65, and a single value is displayed at 58. The display of the value enables an operator to adjust the pressure applied to the press 14 to achieve a desired force applied by the press. In the event that any particular load cell 62, 63, 64, 65 generates a reading that is above the averaged amount by a predetermined percentage (e.g., 20% greater than the average), an error signal is displayed at 58, indicating that there is a misalignment or other defective condition.

In conclusion, the heat sealer of the present invention is able to provide accurate readings of the heat applied to heat-seal a work product, and the actual force applied to the die 38, 40 of the heat sealer. These temperature and pressure values are necessary to enable accurate validation procedures and are useful to determine optimal pressure and temperature values for a given product and given sealing component.

Although the invention is shown and described with respect to certain embodiments, it is obvious that equivalents and modifications will occur to those skilled in the art upon reading and understanding the specification and the appended claims. The present invention includes all such equivalents and modifications and is limited only by the scope of the claims.

What is claimed is:

1. A heat sealer comprising:
a press having a reciprocating, heated platen;
a shuttle having a base that reciprocates between a position aligned with said platen, whereby said press advances said heated platen to said base, and a position removed from alignment with said platen;
a die mounted on said base; and
a load sensor mounted on said shuttle whereby said sensor detects a force exerted by said heated platen on said base when said base is aligned with said heated platen, wherein said load sensor is permanently aligned with said heated platen such that when said base is aligned with said heated platen, said heated platen, said base and said load sensor are aligned.

2. The heat sealer of claim 1 further comprising a control connected to receive a signal from said load sensor corresponding to a force exerted by said heated platen on said base and adjust said force to a predetermined value in response thereto.

3. The heat sealer of claim 1 wherein said load sensor includes at least one pair of load cells.

4. The heat sealer of claim 1 wherein said load sensor is mounted such that said base is positioned between said heated platen and said load sensor when said base is aligned with said heated platen.

5. The heat sealer of claim 1 wherein said shuttle includes a wear rail assembly and said load sensor is mounted on said wear rail assembly.

6. The heat sealer of claim 1 further comprising a second base mounted on said shuttle, wherein said second base moves into and out of alignment with said platen alternatively with said base.

7. A heat sealer comprising:
a press having a reciprocating, heated platen;
a shuttle having a first base and a second base mounted on said shuttle, wherein said first and second bases alternatively reciprocate between a position aligned with said platen and a position removed from alignment with said platen;
a die mounted on each of said bases;
a load sensor, having at least one pair of load cells, mounted on said shuttle such that said bases are positioned between said heated platen and said sensor when said bases are aligned with said heated platen, whereby said sensor detects a force exerted by said heated platen on said bases when said bases are aligned with said heated platen; and
a control connected to receive a signal from said load sensor corresponding to a force exerted by said heated platen on said bases and adjust said force to a predetermined value in response thereto.

8. A heat sealer comprising:
a press having a reciprocating, heated platen;
a shuttle having a first base and a second base mounted on said shuttle, wherein said first and second bases alternatively reciprocate between a position aligned with said platen and a position removed from alignment with said platen;

a die mounted on each of said bases;

an infrared temperature sensor mounted on said shuttle such that said bases are positioned between said heated platen and said sensor when said bases are aligned with said heated platen, wherein said sensor detects a temperature of an exposed surface of said heated platen;

a load sensor, having at least one pair of load cells, mounted on said shuttle such that said bases are positioned between said heated platen and said sensor when said bases are aligned with said heated platen, whereby said sensor detects a force exerted by said heated platen on said bases when said based are aligned with said heated platen; and a control connected to receive a signal from said infrared temperature sensor and said load sensor, said signal corresponding to a temperature of said exposed surface of said heated platen and to a force exerted by said heated platen on said bases, wherein said control adjusts said temperature and said force to predetermined values in response to said signal.

* * * * *